Figure 1A:
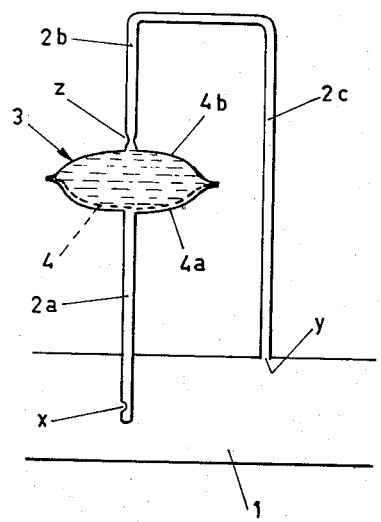

United States Patent [19]

Manders

[11] 4,224,827
[45] Sep. 30, 1980

[54] DEVICE FOR WATCHING THE FLOWING CONDITION OF A GAS IN A CONDUIT

[75] Inventor: Petrus G. J. Manders, Eindhoven, Netherlands

[73] Assignee: Ruti-Te Strake B.V., Deurne, Netherlands

[21] Appl. No.: 389

[22] Filed: Dec. 29, 1978

[30] Foreign Application Priority Data

Dec. 30, 1977 [NL] Netherlands ............... 7714625

[51] Int. Cl.³ ............................. G01F 1/46
[52] U.S. Cl. ................................. 73/861.65
[58] Field of Search ........................ 73/212, 747

[56] References Cited

U.S. PATENT DOCUMENTS

| 424,547 | 4/1890 | Flad | 73/212 |
|---|---|---|---|
| 2,101,165 | 12/1937 | Cole et al. | 73/212 |
| 3,349,615 | 10/1967 | Finkl | 73/212 X |
| 3,546,939 | 12/1970 | Hilderbrand | 73/212 |
| 3,937,082 | 2/1976 | Schilling | 73/212 X |

FOREIGN PATENT DOCUMENTS 913870 6/1946 France ............................. 73/212

Primary Examiner—Gerald Goldberg
Assistant Examiner—Joseph W. Roskos
Attorney, Agent, or Firm—Marshall & Yeasting

[57] ABSTRACT

A device for watching the flowing condition of a gas in a conduit, which device is provided with a liquid tube connecting a velocity pressure point with a static pressure point, whereby the liquid tube comprises a chamber which is divided by a freely movable partition into two leak tight, mutually separated compartments and separates the liquid tube into two sections which each with one end open into a compartment of the chamber and with their other end are connected with the velocity pressure point and the static pressure point of the conduit respectively, the chamber having a volume which corresponds to the product of the maximum admissible height of the liquid column and the cross-section of the liquid tube.

4 Claims, 4 Drawing Figures

DEVICE FOR WATCHING THE FLOWING CONDITION OF A GAS IN A CONDUIT

The invention relates to a device for watching the flowing condition of a gas in a conduit, which device comprises a tube containing liquid and connecting a velocity pressure point with a static pressure point.

The invention relates particularly to a device for watching the flowing condition in the working air feed conduit of a pneumatic weaving machine. It is known to apply in pneumatic weaving machines a device of the initially indicated type in order to permit checking during operation whether the different air fed devices, such as the blowing nozzles transporting the weft yarns through the shed and further pneumatic auxiliary devices are functioning correctly. In a pneumatically correctly functioning weaving machine the liquid tube, in this case a simple U-shaped tube, will adjust itself to a predetermined liquid level between both legs of the U-shape. As soon as the liquid tube indicates a larger or a smaller level difference respectively with respect to the said optimum level difference, this is an indication that a disturbance occurs, e.g. an air leak (with a larger level difference) or a blocking because of a not correctly functioning air valve (with a smaller level difference). In normal operation conditions differences occur between the velocity pressure and the static pressure which are a fraction of the feed pressure which amounts to a couple of bars. The level difference indicated during normal operation conditions by the liquid tube (which e.g. is water filled) therefore is relatively small, while the disturbances occurring during operation cause deviations with respect to the optimum level difference which likewise are small. For watching the flowing condition of the working air during normal operation conditions a liquid tube having relatively short legs will suffice.

However, difficulties may arise when the weaving machine is started up from the stationary condition. In this starting phase often manual intervention is the pneumatic feed system takes place such that many pneumatic auxiliary devices, which during normal operation are energized successively during a short interval, are all simultaneously fed with air, which may lead to a temporary excessive air consumption, whereby the difference between the velocity pressure and the static pressure may rise to an amount which is a multiple of the amount corresponding with the optimum level difference. It then happens that the liquid tube in fact has a too short leg length and that the liquid through the open air connection of the relative leg of the liquid tube having the static pressure point gets into the feed air conduit.

The invention aims at removing the above mentioned disadvantages of the known device while maintaining the simplicity of that device.

According to the invention this aim is achieved in that the liquid tube comprises a chamber which chamber is divided by a freely movable partition or intermediate wall into two separated leak tight compartments and divides the liquid tube into two sections which each with one end open into a compartment of the chamber and with their other end are connected with the velocity pressure point and the static pressure point respectively of the conduit, the chamber having a volume which corresponds to the product of the maximum admissible height of the liquid column and the cross-section of the liquid tube.

In a practical embodiment the freely movable partition is formed by a diaphragm which is anchored at its edge in the chamber wall. Said partition or diaphragm in fact limits the liquid volume which is movable under the influence of the occurring difference between the velocity pressure and the static pressure in the liquid tube. Thereby each tendency of the liqiud tube to indicate a larger level difference than that corresponding to the effective height of the liquid tube is suppressed. The measure according to the invention further has the advantage that the level difference may be measured starting from a more or less fixed zero position so that thereby also the level difference with optimum operation condition is substantially fixed. This contrary to the known device in which the positions of the liquid levels are strongly dependent on the liquid volume in the liquid tube.

For the practical embodiment of the device according to the invention there exist different possibilities. The chamber with the diaphragm may be provided in an upward leg of the liquid tube extending from the velocity pressure point in the conduit, in which case the portion of the upward leg communicating with the compartment over the diaphragm functions as the liquid tube proper and the compartment under the diaphragm is communicated with the air in the conduit. Another possibility is to provide the chamber in one or the other leg of a known U- or J-shaped liquid tube.

The invention is hereunder illustrated with reference to the drawing of two embodiments.

Figure 1B:
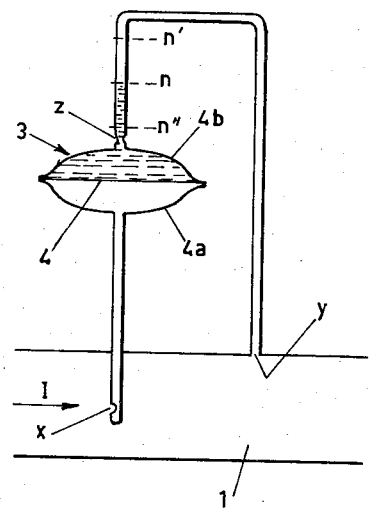
Figure 2A:
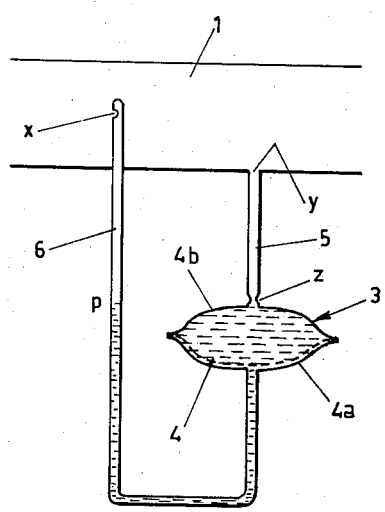
Figure 2B:
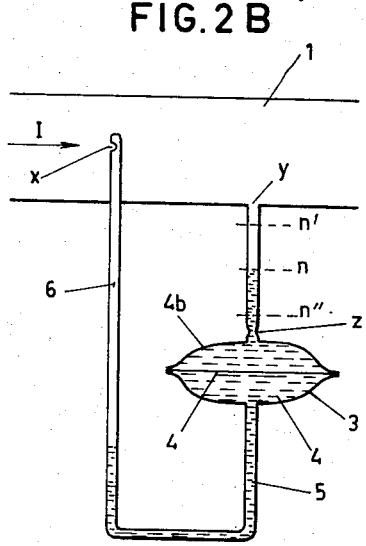

FIGS. 1A and 1B show schematically a first embodiment of the device according to the invention, the device being shown in the rest position (FIG. 1A) and in the normal operation condition (FIG. 1B) respectively; and FIGS. 2A and 2B show schematically a second embodiment of the device according to the invention, namely in the rest position (FIG. 2A) and the normal operation condition (FIG. 2B) respectively.

In the embodiment according to FIGS. 1A and 1B the conduit through which the gas flows (e.g. the working air for a pneumatic weaving machine) is indicated with reference number 1, the device serving for watching the flowing condition of that conduit. The liquid tube is indicated with the reference numbers 2a, 2b, the lower part 2a extending from the velocity pressure point x in the conduit 1 in the vertical direction and being communicated with the bottom of a chamber 3, to the upper wall of which the upper part 2b of the liquid tube is connected. The upper end of the part 2b of the liquid tube communicates via the tube part 2c with the static pressure point y.

The chamber 3 is divided by a diaphragm 4 in a lower and an upper compartment 4a and 4b respectively, the diaphragm being easily deformable under the influence of the gas pressure within the conduit 1, acting on that diaphragm, between two extreme positions in which the volumes of the lower and the upper compartments 4a and 4b respectively of the chamber have a maximum and a minimum value respectively.

In the rest position according to FIG. 1A the diaphragm 4 is in the lower extreme position. In this position the compartment 4b over the diaphragm is maximum and the liquid level of this compartment 4b, filled with liquid (e.g. water) is situated at the connection point with the part 2b of the liquid tube. In the operation condition according to FIG. 1B, in which therefore gas (e.g. the working air of a pneumatic weaving machine) flows in the direction of the arrow I through the conduit 1, the diaphragm 4 is deformed under the influence of the velocity pressure, acting on the lower side of the diaphragm, to the intermediate position as shown and the liquid has been propelled from the compartment 4b in the part 2b of the liquid tube to the level n, corresponding to the normal operation condition. If now a disturbance occurs, e.g. a leak in the circuit of a pneumatic weaving machine, which has to be fed with the working air, the flow velocity of the working air in the conduit 1 will increase, as well as the velocity pressure in the point x, whereby the diaphragm 4 is further deformed in upward direction and the liquid level moves to the level n'. If the disturbance is the result of a blocking, e.g. due to one or more failing air valves, the flow velocity in the conduit 1 will decrease and the level in the part 2b of the liquid tube lowers to the level n". Thereby it is easily determinable with reference to the deviation with respect to the normal level n whether the pneumatic portion of the weaving machine is functioning free or not free of disturbances. Thereby the normal level will adjust itself always to the same constant height, within predetermined limits, independent of the quantity of liquid over the diaphragm 4, since the position in which the diaphragm 4 has been anchored along its periphery in the wall of the chamber 3, may be considered as the fixed zero level.

In the embodiment according to FIGS. 2A, 2B the chamber 3 has been provided in the leg 5 of the U-shaped liquid tube, which leg communicates with the static pressure point y.

In the rest position according to FIG. 2A the diaphragm 4 is in its lower position and the liquid level in the leg 6 communicating with the velocity pressure point x is at the level p. In the normal operation condition according to FIG. 2B the diaphragm 4 has been deformed under the influence of the velocity pressure acting on the liquid in the leg 6 in upward direction to an intermediate position in which part of the liquid has been propelled from the upper compartment 3b of the chamber to the normal level n. The levels corresponding with a disturbance caused by a leak and caused by a blocking respectively are indicated by n' and n" respectively. It will be clear that the chamber 4 could be provided, in place of in the leg 5, equally well in the leg 6, while the lower side of the diaphragm 4 could if desired be directly communicating with the air in the velocity pressure point x.

During normal operation the flow velocity in the conduit 1 of course is not necessarily constant. The air consumption in case of a pneumatic weaving machine will during normal operation vary between certain limits whereby the "normal" level n has a tendency to vibrating. Since the present invention particularly aims at monitoring deviations with respect to the average consumption level during normal operation conditions it may be desirable to suppress the tendency to vibration of the normal consumption level by providing in the liquid tube a flow restriction. A suitable position therefore is the point z in which the part of the liquid tube (2b, c in FIGS. 1A, B or 5 in FIGS. 2A, 2B respectively) communicating with the velocity pressure point y, is connected with the chamber 3.

What we claim is:

1. A device for monitoring the flow condition of gas in a conduit comprising, in combination, a first tube connected to a velocity pressure point in the conduit, a second tube connected to a static pressure point in the conduit, a liquid-containing chamber which is divided by a freely movable partition into two leak-tight, mutually separated compartments communicating one with the first tube and the other with the second tube intermediate the points, the second tube including a vertical leg above the chamber through which the second tube communicates with its respective compartment, the partition being deformed by said liquid in response to flow condition of the gas to force the liquid out into a column in the vertical leg to reading levels.

2. A device according to claim 1 wherein the chamber has a volume corresponding to the product of the maximum admissible height of said liquid column and the cross-section of the vertical leg of the second tube.

3. A device according to claim 1 wherein the second tube has a flow restriction for suppressing vibration of said liquid column.

4. A device according to claim 3 wherein the flow restriction is located at the connection of the second tube with the chamber.

* * * * *